(12) United States Patent
Hoffner et al.

(10) Patent No.: US 10,715,976 B2
(45) Date of Patent: Jul. 14, 2020

(54) METHOD AND SYSTEM FOR EVENT DETECTION BASED ON VEHICULAR MOBILE SENSORS AND MEC SYSTEM

(71) Applicant: Verizon Patent and Licensing Inc., Arlington, VA (US)

(72) Inventors: Barry F. Hoffner, Bridgewater, NJ (US); James Mathison, Warren, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/174,958

(22) Filed: Oct. 30, 2018

(65) Prior Publication Data
US 2020/0137535 A1 Apr. 30, 2020

(51) Int. Cl.
| | | |
|---|---|---|
| G08B 21/00 | (2006.01) | |
| H04W 4/40 | (2018.01) | |
| G06K 9/00 | (2006.01) | |
| H04W 4/90 | (2018.01) | |
| G07C 5/00 | (2006.01) | |

(52) U.S. Cl.
CPC .......... *H04W 4/40* (2018.02); *G06K 9/00791* (2013.01); *G07C 5/008* (2013.01); *H04W 4/90* (2018.02)

(58) Field of Classification Search
CPC .......... H04W 4/40; H04W 4/90; G07C 5/008; G07C 5/0808; G07C 5/0866; G06K 9/00791; G06K 9/00973; G06K 9/00718; G06K 2009/00738; G08B 21/18; G08B 21/182; G08B 17/00; G06F 16/7867; H04N 5/77; H04N 5/907; H04N 5/772; G06Q 30/0207; G06Q 30/0261; G06Q 30/0266
USPC .... 340/540, 435, 436, 425.5, 539.13, 539.1, 340/905
See application file for complete search history.

(56) References Cited

U.S. PATENT DOCUMENTS

| | | | | |
|---|---|---|---|---|
| 10,304,338 | B1* | 5/2019 | Lau ...................... | G08G 1/162 |
| 2010/0219944 | A1* | 9/2010 | McCormick .......... | G07C 5/008 |
| | | | | 340/436 |
| 2014/0167954 | A1* | 6/2014 | Johnson ................ | H04W 76/10 |
| | | | | 340/539.11 |
| 2015/0327039 | A1* | 11/2015 | Jain ........................ | H04W 4/90 |
| | | | | 455/404.2 |
| 2017/0045571 | A1* | 2/2017 | Joseph ................. | G01R 31/085 |
| 2018/0322785 | A1* | 11/2018 | Jerichow ................ | G08G 1/162 |

* cited by examiner

*Primary Examiner* — Anh V La

(57) ABSTRACT

A method, a device, and a non-transitory storage medium are described in which an event detection service is provided. A network device of a Multi-access Edge Computing network receives sensed data from vehicular devices and metadata. The network device is pre-configured with criteria information to detect events including events pertaining to public safety. The network device also can be remotely triggered to detect customized events. The network device may trigger vehicular devices to capture sensed data. The network device may receive and analyze the sensed data and the metadata, and determine whether the customized event is detected.

20 Claims, 13 Drawing Sheets

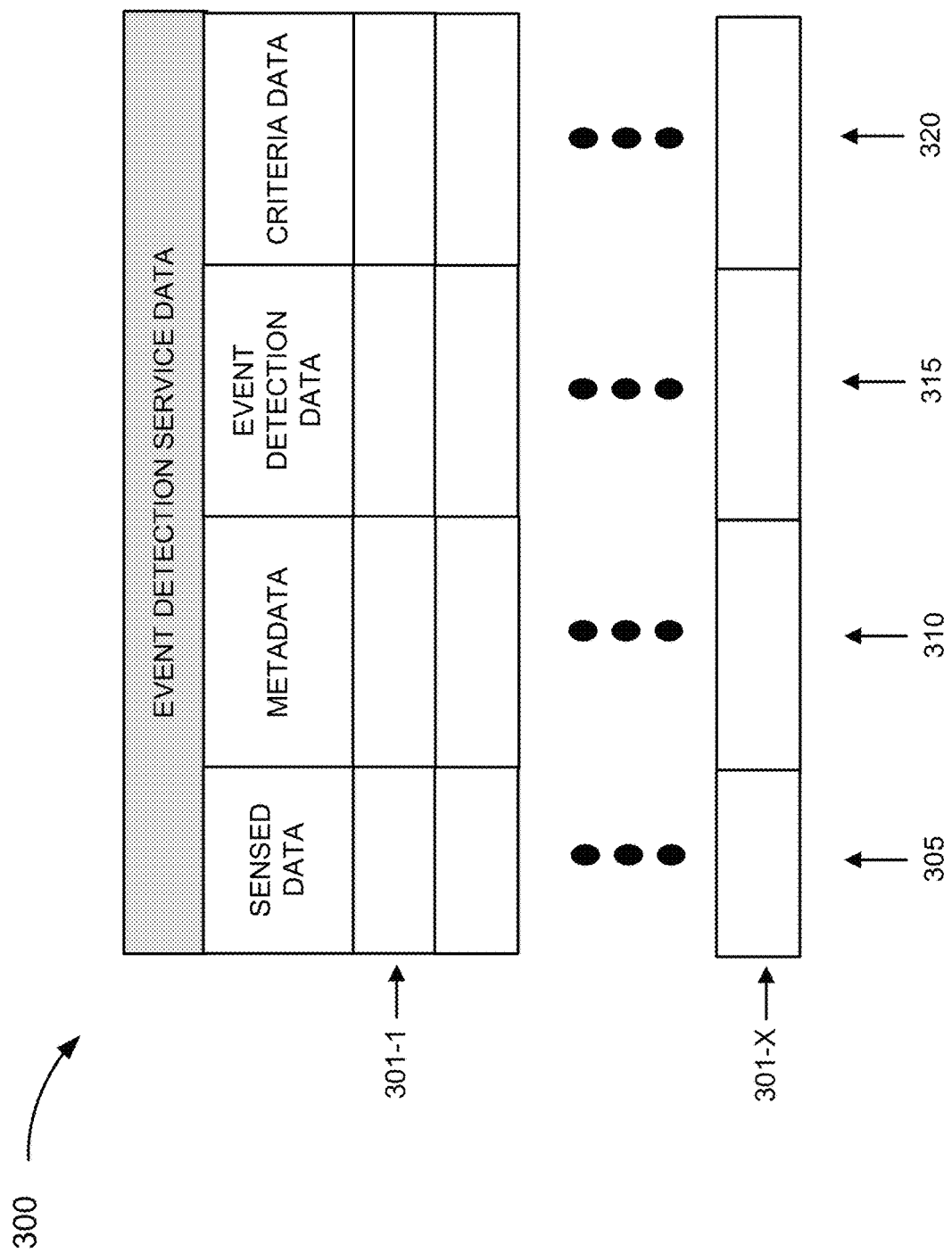

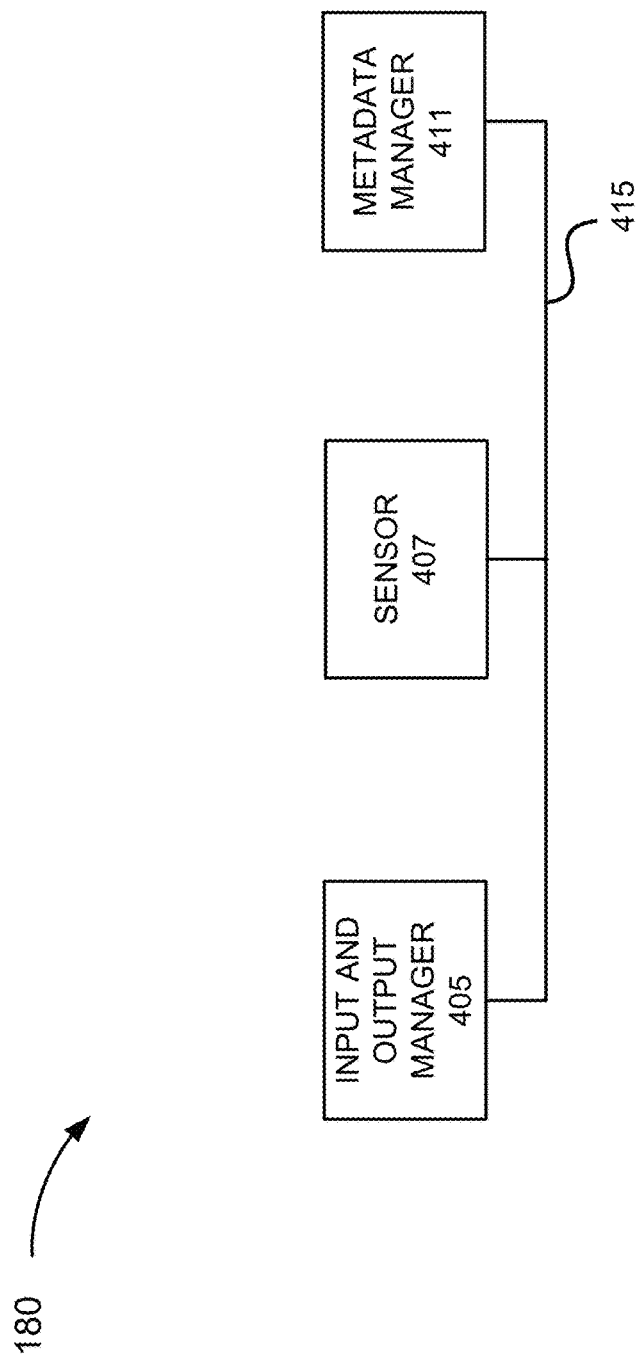

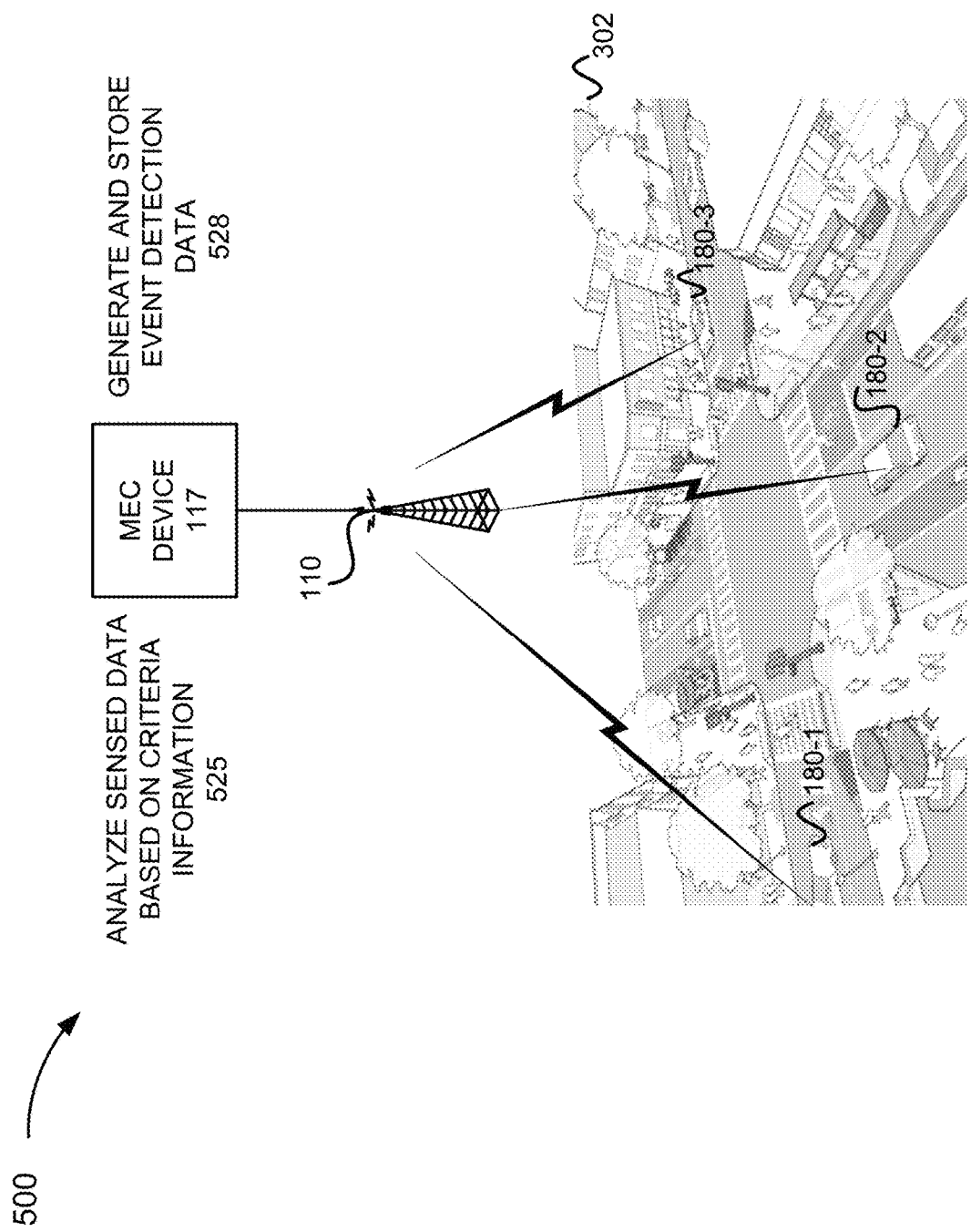

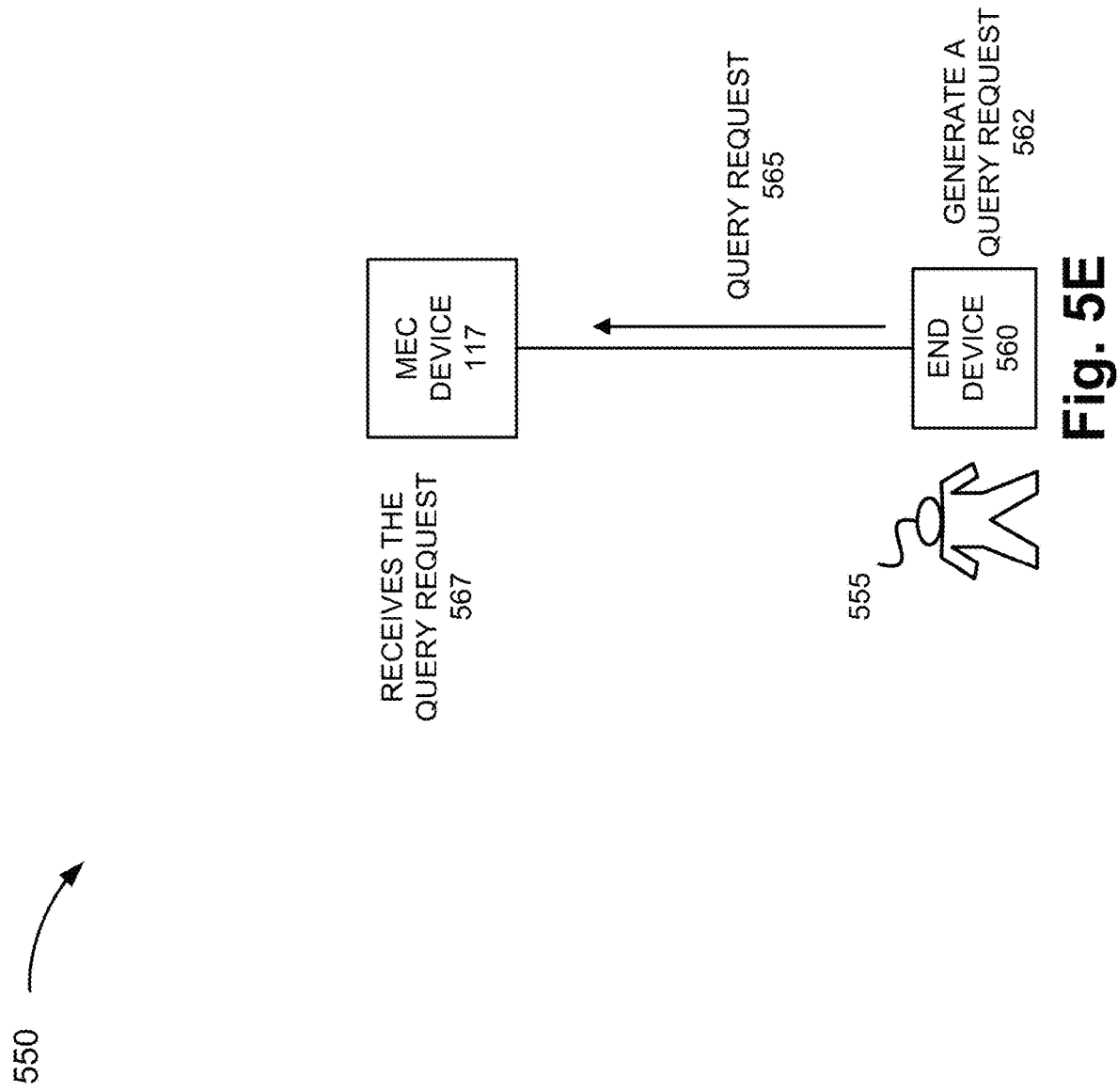

METHOD AND SYSTEM FOR EVENT DETECTION BASED ON VEHICULAR MOBILE SENSORS AND MEC SYSTEM

BACKGROUND

Ubiquitous communication and information exchange offer users numerous advantages. In order to enhance performance, Multi-access Edge Computing (MEC) (also known as mobile edge computing) is being explored in which core network capabilities (e.g., computational, storage, etc.) are situated at the network edge to improve latency and reduce traffic being sent to the core network.

BRIEF DESCRIPTION OF THE DRAWINGS

FIG. 3 is a diagram illustrating exemplary event detection service data;

FIG. 4 is a diagram illustrating exemplary components of a vehicular device depicted in FIG. 1;

FIGS. 5A-5G are diagrams illustrating exemplary processes of an exemplary embodiment of the event detection service according to an exemplary scenario;

DETAILED DESCRIPTION OF PREFERRED EMBODIMENTS

Figure 1:
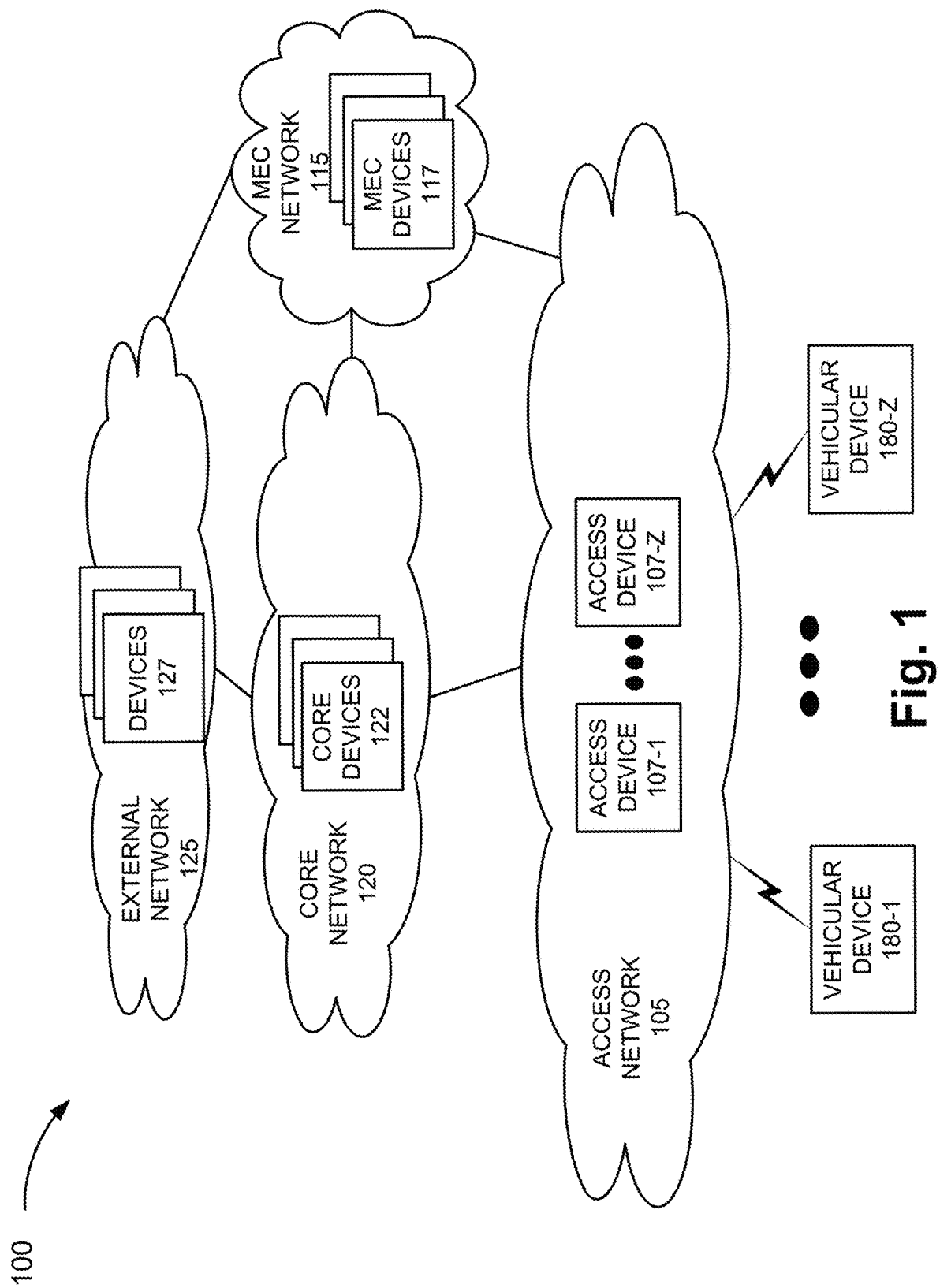
FIG. 1 is a diagram illustrating an exemplary environment in which an exemplary embodiment of an event detection service may be implemented.

The following detailed description refers to the accompanying drawings. The same reference numbers in different drawings may identify the same or similar elements. Also, the following detailed description does not limit the invention.

With the advent of autonomous vehicles (e.g., cars, trucks, etc.) and other types of mobile devices (e.g., unmanned drones, non-autonomous vehicles, etc.), such devices may include a video camera and/or another type of sensor (e.g., a heat sensor, an odor sensor, etc.). For example, an autonomous vehicle may include a video camera that captures audio and video data (or only video data) and analytics that use the audio and video data (audio/video data) to facilitate an operation of the vehicle in real-time (e.g., driving down the road, parking, adhering to various traffic signs, traffic lights, etc.). In this regard, the audio/video data is used by the vehicle itself, and the usefulness of the audio/video data is somewhat fleeting by virtue of its intended purpose (e.g., to facilitate the real-time operation of the vehicle). In fact, the audio/video data may be deleted or overwritten subsequent to an analysis of the audio/video data that supports the driverless capabilities of the autonomous vehicle. Unfortunately, the resources of the autonomous vehicle (or another type of mobile device) that are allocated to capture and store the audio/video data (or another type of sensed data) are sub-optimally utilized because the use of the sensed data may support a variety of services and applications other than those to which the resources are dedicated, such as the operation of the autonomous vehicle or other mobile device.

According to exemplary embodiments, an event detection service is provided. According to an exemplary embodiment, the event detection service is provided, in part, by a vehicular-based device, such as an autonomous vehicle (e.g., a driverless car, a driverless truck, etc.) or a non-autonomous vehicle (e.g., a car, a truck, or another type of road-based passenger vehicle) that includes a sensor. According to an exemplary implementation, the sensor may be a sensor that supports the operation of the vehicle (e.g., navigation, collision avoidance, parking assistance, etc.) and supports the event detection service, as described herein. According to another exemplary implementation, the sensor may be a dedicated sensor. For example, the sensor may be distinct from a sensor that contributes to the operation of the vehicle. According to some exemplary implementations, the sensor of the event detection service may be part of the vehicle when manufactured. According to other exemplary embodiments, the event detection service is provided, in part, by a non-vehicular-based device, such as a device included in an unmanned drone. For the sake of simplicity of description, the term vehicular device will be used to indicate a device in an autonomous vehicle, a non-autonomous vehicle, or an unmanned drone that provides the event detection service, as described herein.

According to an exemplary embodiment, the vehicular device may be triggered to detect an event, as described herein. According to an exemplary implementation, the trigger may be pre-configured internally (e.g., from a manufacturer of the vehicular device or a sensor included in the vehicular device). According to another exemplary implementation, vehicular device may be triggered from a remote source. For example, a user of the event detection service may trigger a vehicular device via a MEC device, as described herein. Alternatively, a manufacturer of the vehicular device or the sensor, or another entity may trigger the vehicular device from a location remote from the vehicular device. According to yet another example, a person in the vehicular device may trigger the detection of the event.

According to an exemplary embodiment, in response to the trigger, the vehicular device captures sensed data via a sensor. For example, an autonomous vehicle may capture audio/video data (or video data) of its current surroundings via a video camera/microphone. According to other examples, as described herein, the vehicular device may capture other types of sensed data (e.g., chemical, light, smoke, etc.) via other types of sensors. According to an exemplary embodiment, the vehicular device generates various types of metadata, such as date, time, and location information, pertaining to the sensed data. For example, the vehicular device may generate date, time, and location information pertaining to audio/video data that was captured. The vehicular device may (temporarily) store the sensed data and the metadata. According to an exemplary embodiment, the vehicular device transmits the stored sensed data and the metadata to a MEC device.

According to an exemplary embodiment, the event detection service is provided, in part, by a MEC device. According to an exemplary embodiment, the MEC device receives the sensed data and the metadata from a vehicular device. According to an exemplary embodiment, the MEC device includes analytics to identify a person, an animal, or an object of interest based on the sensed data and one or multiple criteria, as described herein. For example, the MEC device may recognize a mentally ill elderly person, a lost child, a missing pet, or another vehicle (e.g., a car, etc.) of interest based on an analysis of the sensed data, such as audio/video data. According to other exemplary embodiments, the MEC device may identify an event, such as the presence of a fire, an accident (e.g., a motor vehicle accident, a train accident, etc.), a chemical spill, an explosion, a power outage, a water main break, a broken utility pole (e.g., electricity, television, telephone, etc.) based on an analysis of the sensed data and one or multiple criteria, as described herein. For the sake of simplicity of description, the term "event detection" is used to indicate the detection and/or recognition of a person, an animal, an object, or an event of interest.

According to an exemplary embodiment, the MEC device may generate and store event detection data. The event detection data may indicate a result of the analysis of the sensed data in relation to event detection. For example, the event detection data may indicate that an event is detected or not detected. The event detection data may also include the correlated metadata and other data, as described herein.

According to an exemplary embodiment, based on the event detection, the MEC device may communicate or report the results of its analysis to a network device. For example, the MEC device may communicate the results of event detection to a network device associated with law enforcement, local and/or federal government or agency, a service provider, or another type of type of entity that uses the event detection service.

According to an exemplary embodiment, the MEC device may include a trigger request service that allows a user to invoke the detection of an event. For example, the user may transmit a trigger request message to the MEC device. The trigger request message may include criteria information (e.g., an image of a person of interest), date and time information (e.g., Oct. 17, 2018, 2 pm-7 pm), and location information (e.g., city, state, intersection, or another type of identifier indicating a geographic area). In response, the MEC device may transmit a trigger message via an access network to vehicular devices that are located in the specified location during the specified date and time periods. The MEC device may receive sensed data and metadata from the vehicular devices, and may analyze the sensed data based on the criteria information. The MEC device may make available or transmit a trigger response message, which includes the result of the event detection, to the user.

According to another exemplary embodiment, the MEC device may include a query service in which a user of the event detection service may query the MEC device for sensed data, and metadata stored by the MEC device. For example, the user (e.g., law enforcement or another type of user of the event detection service) may transmit a query request, via an end device to the MEC device, for audio/video data (or another type of sensed data) pertaining to an event (e.g., a crime, a power outage, a missing person, etc.). The query request may include date, time, and location information or other types of information that relates to the event detection service, as described herein. The MEC device includes logic that searches the sensed data and the metadata based on the query request. For example, the MEC device may search the stored metadata, which is correlated to the stored sensed data, based on date, time, and location information included in the query request, and possibly other types of information included in the query request. The MEC device selects sensed data and metadata based on the result of the search. For example, the MEC system may select audio/video data having different vantage points that satisfy the query request.

According to an exemplary embodiment, the MEC device includes logic that provides an intelligence service that modifies criteria information relative to the triggering request service or the query service, as described herein. For example, depending on the type of event and the context (e.g., time of request relative to the occurrence of the event), the MEC device may modify the values of criteria (e.g., date, time, location, etc.) included in a request. By way of further example, if the event is a bank robbery, the request may include the date and time of the robbery, the location of the bank, and perhaps other data (e.g., an image of a suspect, type of car, etc.). In response to detecting the event based on the criteria information included in the request, the MEC system may automatically adjust the values of the date, time, and location so as to search and select video data that may relate to events occurring prior to the bank robbery (e.g., the suspect's transport to the bank) and subsequent to the bank robbery (e.g., the escape of the suspect). In this way, the MEC device may provide a timeline of video data starting from prior to the bank robbery, during the bank robbery, and after the bank robbery of which the time and location, and possibly the date, relating to the sensed data changes. According to an exemplary implementation, the MEC device may analyze video data pertaining to another request or event that corresponds to the date, time, and location for this event.

According to another exemplary embodiment, the MEC device includes logic that generates and transmits a new trigger message in response to detecting an event. For example, the MEC device may determine that an explosion occurred based on the analysis of sensed audio data. In response to this determination, the MEC device may generate and transmit a trigger message directed to capture video data from vehicular devices 180 that are located in the area of the detected explosion (e.g., based on the metadata). The MEC device may further analyze and confirm the detection of the explosion based on analysis of the video data received from vehicular devices 180.

As a result, the event detection service may improve the technological art of surveillance based on using vehicular devices as a source for sensed data, and the MEC for analysis of various events of interest and event detection. Additionally, the event detection service may reduce network resource utilization in a network by virtue of having fewer end devices dedicated to a single application/service. For example, autonomous cars, which may already use various network resources (e.g., physical, logical, virtual) in relation to network devices of a RAN and/or the MEC, can support not only an application/service pertaining to the operation of the autonomous car (e.g., navigation, parking, collision avoidance, etc.) but also surveillance.

FIG. 1 is a diagram illustrating an exemplary environment 100 in which an exemplary embodiment of the event detection service may be implemented. As illustrated, environment 100 includes an access network 105, a MEC network 115, a core network 120, and an external network 125. Access network 105 may include access devices 107-1 through 107-Z (referred to collectively as access devices 107 and individually (or generally) as access device 107). MEC network 115 includes MEC devices 117. Core network 120 includes core devices 122. External network 125 includes devices 127. Environment 100 further includes vehicular devices 180-1 through 180-W (referred to collectively as vehicular devices 180 and individually (or generally) as vehicular device 180).

The number, the type, and the arrangement of network devices, and the number of vehicular devices 180 are exemplary. A network device, a network element, or a network function (referred to herein simply as a network device) may be implemented according to one or multiple network architectures (e.g., a client device, a server device, a peer device, a proxy device, a cloud device, a virtualized function, etc). Additionally, a network device may be implemented according to a centralized computing architecture, a distributed computing architecture, or a cloud computing architecture (e.g., an elastic cloud, a private cloud, a public cloud, etc.).

According to other exemplary embodiments, environment 100 may include additional networks, fewer networks, and/or different networks than those illustrated and described herein. For example, environment 100 may not include external network 125. Additionally, or alternatively, environment 100 may include a fog network and/or another type of network not specifically mentioned herein.

Environment 100 includes communication links between the networks, between the network devices, and between the network devices and the networks. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Access network 105 may include one or multiple networks of one or multiple types and technologies. For example, access network 105 may include a 4G RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network or an LTE-A Pro network), a future or next generation RAN (e.g., a 5G-access network (5G-AN) or a 5G-RAN (referred to herein as simply a 5G-RAN)). Access network 105 may include other types of RANs (e.g., a Third Generation (3G) RAN, a 3.5G RAN, a U-TRAN, a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, and/or an Evolution Data Optimized (EV-DO) RAN).

Access network 105 may communicate with other types of access networks, such as, for example, a WiFi network, a Worldwide Interoperability for Microwave Access (Wi-MAX) network, a local area network (LAN), a Citizens Broadband Radio System (CBRS) network, a cloud RAN, a wired network (e.g., optical, cable, coaxial, copper, etc.), or other type of network that provides access to or can be used as an on-ramp to access network 105, MEC network 115, and/or core network 120.

Depending on the implementation, access network 105 may include various types of network devices that are illustrated in FIG. 1 as access devices 107. For example, access device 107 may be implemented as an evolved Node B (eNB), an eLTE eNB, a next generation Node B (gNB), a base station (BS), a base transceiver station (BTS), a Node B, a remote radio head (RRH), an RRH and a baseband unit (BBU), a BBU, a radio network controller (RNC), a small cell node (e.g., a picocell device, a femtocell device, a microcell device, etc.), or another type of network device, such as a repeater.

Additionally, access network 105 may include different and multiple functional splitting, such as options 1, 2, 3, 4, 5, 6, 7, or 8 that relate to the splitting of the physical layer, Media Access Control (MAC), Radio Link Control (RLC), and Packet Data Convergence Control (PDCP), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA), network slicing, coordinated multipoint (CoMP), and/or another type of connectivity service.

According to various exemplary embodiments, access network 105 may be implemented according to various architectures of wireless service, such as, for example, macrocell, microcell, femtocell, picocell, metrocell, non-cell, or other configuration. Additionally, according to various exemplary embodiments, access network 105 may be implemented according to various wireless technologies (e.g., radio access technology (RAT), etc.), wireless standards, wireless frequencies/bands, and different segments of radio spectrum (e.g., centimeter (cm) wave, millimeter (mm) wave, below 6 Gigahertz (GHz), above 6 GHz, licensed radio spectrum, unlicensed radio spectrum, carrier frequency, etc.).

MEC 125 includes a platform that provides applications and services at the edge of a network, such as access network 105. MEC 125 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology.

Depending on the implementation, MEC 125 may include various types of network devices that are illustrated in FIG. 1 as MEC devices 117. For example, MEC devices 117 may include virtualized network functions (VNFs), multi-access (MA) applications/services, and/or servers. MEC network 115 may also include other MEC devices 117 that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices (e.g., routers, etc.), and network resources (e.g., storage devices, communication links, etc.). According to some exemplary embodiments, MEC devices 117 may be co-located with core devices 122 of core network 120.

According to an exemplary embodiment, one or multiple of MEC devices 117 include logic that supports the event detection service, as described herein. For example, the MEC devices 117 may include a storage device and a computational device. The storage device may manage and store various types of data, such as sensed data, metadata, event detection data, criteria information, and other data described herein. The computational device may include logic that supports various services of the event detection service, such as a triggering service, an ingestion service, an analytics service, a detection service, a query service, and other services described herein.

Figure 2:
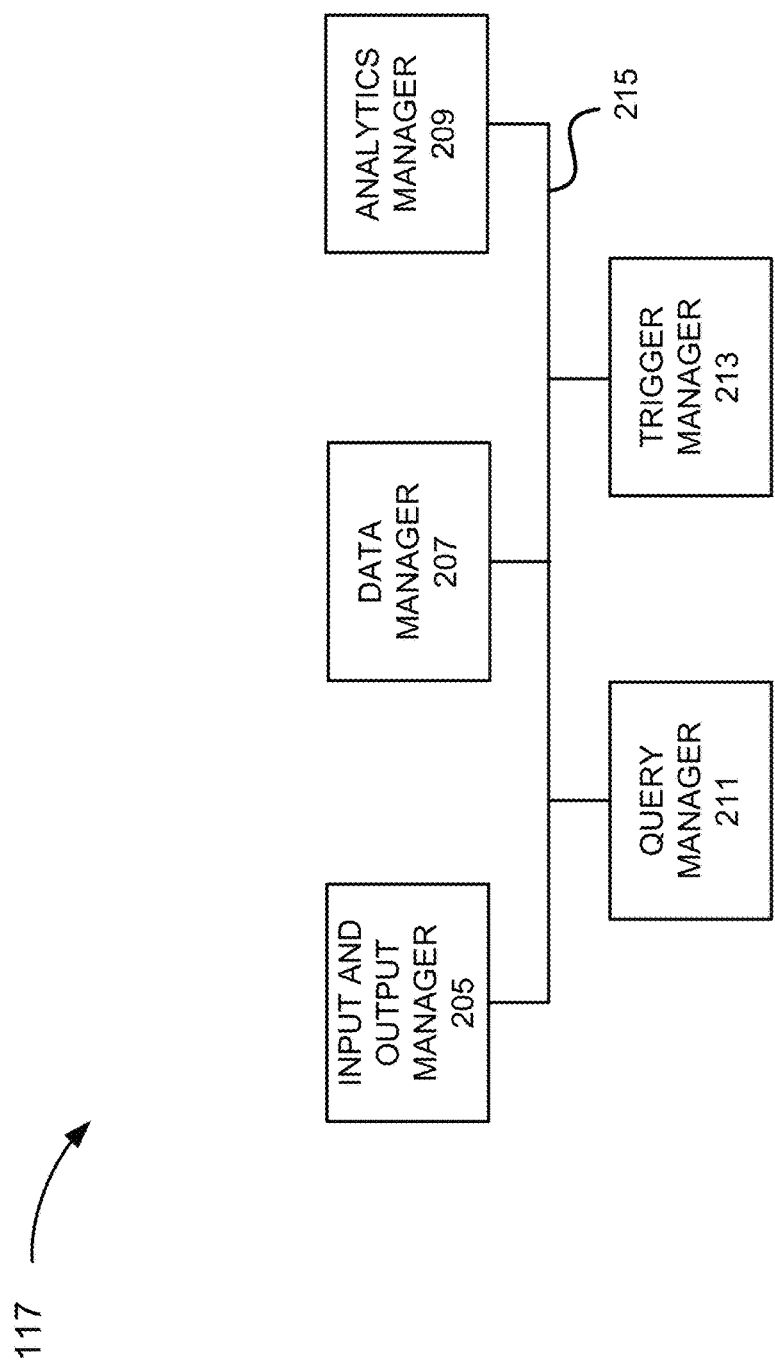
FIG. 2 is a diagram illustrating exemplary components of a MEC device depicted in FIG. 1.

FIG. 2 is a diagram illustrating exemplary components of a MEC device 117 that provides an exemplary embodiment of the event detection service. As illustrated, MEC device 117 includes an input and output manager 205, a data manager 207, an analytics manager 209, a query manager 211, a trigger manager 213, and a link 215. According to other exemplary embodiments, MEC device 117 may include additional, fewer, and/or different components. Additionally, multiple components may be combined into a single component. Additionally, or alternatively, a single component may be implemented as multiple components in which a process or a function may be collaboratively performed or multiple processes or functions may be split between them. According to various embodiments, one or more of the components may operate on various planes of an environment. For example, the various planes may include a data plane, a control plane, a management plane, and/or other planes implemented within the environment.

Input and output manager 205 includes logic that manages the messages received and the messages transmitted by MEC device 117. For example, input and output manager 205 may include logic that receives and interprets a trigger request message indicating to capture sensed data. For example, the trigger request message may be received from device 127, a person of vehicular device 180 (e.g., a driver, a passenger, a person operating/controlling the unmanned drone, etc.), or another user of the event detection service via an end device.

Input and output manager 205 may include logic that receives and interprets a detection message that includes sensed data and metadata. For example, the detection message may be received from vehicular device 180. Input and output manager 205 may also receive other types of messages, such as a query request associated with the query service, or other messages, as described herein. Input and output manager 205 may include logic that generates and transmits various types of messages, as described herein. For example, input and output manager 205 may transmit a trigger message, which may include data of the trigger request message, to vehicular device 180. Input and output manager 205 may also transmit a query response associated with the query service, and any other message, as described herein. Input and output manager 205 may also transmit a trigger message, which is not responsive to a trigger request message, but based on a schedule (e.g., to collect and analyze sensed data) or another configuration, as described herein.

Data manager 207 includes logic that provides an ingestion service that ingests, stores, and manages event detection service data. For example, data manager 207 may include a database management system (DBMS). The DBMS may be implemented using conventional, well-known, or commercially available relational or No Structured Query Language (NoSQL) software/packages (e.g., Microsoft SQL, Oracle Database, Cassandra, MongoDB, etc.). Alternatively, data manager 207 may include another type of data management system. Data manager 207 includes logic that may perform other storage-related and/or data management-related functions, such as, formatting data (e.g., transforming raw data into a particular format), compression and decompression, data integrity verification, adding data, deleting data, maintaining data quality, providing data access, providing data extraction, encryption, classification of data (e.g., type of sensed data, such as audio/video, olfactory data, etc.), etc., for a database or another type of data structure.

According to an exemplary embodiment, data manager 207 may receive sensed data and metadata from vehicular device 180, and store the sensed data and the metadata. According to some examples, the ingestion of the sensed data and the metadata may be responsive to the triggering service. According to other examples, the ingestion of the sensed data and the metadata may be responsive to vehicular device 180 capturing and transmitting this data to MEC device 117 based on a pre-configured trigger associated with vehicular device 180 or a trigger stemming from a source other than the triggering service.

FIG. 3 is a diagram illustrating exemplary event detection service data that may be stored in a table 300. As illustrated, table 300 may include a sensed data field 305, a metadata field 310, an event detection field 315, and a criteria data field 320. As further illustrated, table 300 includes records 301-1 through 301-X that each includes a grouping of fields 305, 310, 315, and 320 that may be correlated. Event detection service data is illustrated in tabular form merely for the sake of description. In this regard, event detection service data may be implemented in a data structure different from a table.

Sensed data field 305 may store sensed data. For example, depending on the sensor of vehicular device 180, the sensed data may include audio data, video data, image data, parameter and parameter value data, and/or other types of data (e.g., raw, pre-processed, etc.) stemming from a sensor of vehicular device 180.

Metadata field 310 may store metadata pertaining to the sensed data. For example, metadata field 310 may store date, time, and location information pertaining to the sensed data. The metadata may include other types of data. For example, the metadata may indicate the resolution of the visual data (e.g., high-definition (HD), 4K, 8K, etc.) and/or the audio data (e.g., 16 bit, 24 bit, etc.), data pertaining to the sensor (e.g., make, model, manufacturer, etc.), and/or other data relating to the sensed data or the sensor. According to some exemplary embodiments, the sensed data received from vehicular device 180 may include instances of the metadata, such as date, time, location, and/or other types of data. According to other exemplary embodiments, the sensed data received from vehicular device 180 may not include each instance of the metadata. For example, input and output manager 205 or data manager 207 may add an instance of metadata (e.g., date and time in correspondence to when the sensed data is received).

Event detection data field 315 may store data indicating whether a person, an animal, an object, or an event of interest is detected or identified. For example, event detection data field 315 may store data indicating that a person of interest is identified or that a chemical spill has occurred. When the person, the animal, the object, or other event of interest is detected, event detection data field 315 may store pointers or other data indicating, in whole or in part, the sensed data and the metadata that supports the determination that the person, the animal, the object, or the event of interest is detected.

Criteria data field 320 may store data indicating one or multiple criteria data for determining whether a person, an animal, an object, or an event of interest is detected or identified. For example, criteria data field 320 may store an image of a person or an animal of interest, a threshold parameter and a threshold parameter value, text data, and/or other data that may be used by analytics manager 209. According to some exemplary embodiments, the one or multiple criteria data may be pre-configured. For example, a parameter and a parameter threshold value pertaining to the presence of a chemical may be pre-configured to determine whether a chemical spill has occurred. According to other exemplary embodiments, the one or multiple criteria data may be dynamically provisioned. For example, a user of the event detection service may submit an image of a lost loved one or a lost pet. Additionally, for example, the user may specify a date, a time period, and a location that may govern the capturing of the sensed data and/or the analytic service, as well as other configurable parameters.

According to other exemplary implementations, table 300 may store additional, fewer, and/or different instances of event detection service data in support of the event detection service, as described herein. For example, as described herein, table 300 may include a type of event field. The type of event field may indicate the type of event to be detected (e.g., a fire, an explosion, etc.). The type of event field may be correlated to data stored in criteria data field 320. For example, as described herein, pre-configured criteria information may be correlated to pre-configured types of events. Additionally, for example, table 300 may include a vehicular device identifier that identifies vehicular device 180 from which the sensed data is received.

Referring back to FIG. 2, analytics manager 209 includes logic that analyzes the sensed data and criteria information, and determines whether a person, an animal, an object, or other event of interest is detected or identified. Analytics manager 209 may be pre-configured with one or multiple criteria for detection or identification. For example, analytics manager 209 may be pre-configured with parameters and parameter values that are used to detect various events, such as chemical spills, smoke from a fire, a broken utility pole, or another type of event. These parameters and parameter values correlate to the type of sensor and correspondingly to the type of sensed data. For example, a chemical sensor may generate a parameter and a parameter value indicating a measure of a chemical in the air. According to another example, a smoke detector may generate a parameter and a parameter value indicating a measure of smoke in the air. Analytics manager 209 may store threshold parameters and parameter values that are used to determine whether a chemical spill or a fire is present. According to another example, analytics manager 209 may be pre-configured with threshold parameters and parameter values to determine whether an explosion occurred. For example, sensed audio data may indicate a decibel level, a reverberation signature, a sound envelope, frequency composition, and/or other auditory signature representative of an explosion. According to other examples, analytics manager 209 may be pre-configured with inference models associated with object recognition and detection. For example, a machine-learning system may use an inference model to classify and identify a broken utility pole, a water main break, a fire, or various other types of events, as described herein. For the sake of description, the machine learning system may include various facets of technology, such as, for example, deep learning, neural networks, artificial intelligence, computer vision, among others, and may be implemented in many forms including, for example, supervised learning, unsupervised learning, reinforcement learning, convolutional neural networks, recurrent neural networks, or other architectures and frameworks.

According to some exemplary embodiments, analytics manager 209 may use multiple types of sensed data to detect an event. For example, analytics manager 209 may use visual data and smoke detector-based data to determine whether event detection is a fire. According to another example, analytics manager 209 may use visual data, audio data, and chemical/smoke detector-based data to determine whether event detection is an explosion.

According to some exemplary embodiments, analytics manager 209 may be pre-configured to detect one or multiple types of events based on the type of sensed data. For example, analytics manager 209 may be pre-configured to detect chemical spills, fires, explosions, power outages, gas leaks, water main breaks, a downed telephone pole, a downed tree, or other types of events or objects based on the type of sensed data received from vehicular devices 180. In this regard, the detection of certain types of events may lend themselves to criteria that may not require dynamic configuration (e.g., detecting a lost child based on an image of the lost child for comparison). Additionally, according to some exemplary embodiments, analytics manager 209 may be configured to analyze a certain type of sensed data for multiple types of events. In this way, analytics manager 209 may perform event detection for a type of event without data indicating the type of event that is to be detected when the analysis begins.

According to an exemplary embodiment, analytics manager 209 may be dynamically configured with one or multiple criteria for event detection. For example, a user of the event detection service may submit, via a message or via an interactive graphical user interface (GUI) of MEC device 117, an image of a person or an animal of interest, along with other criteria information, as described herein.

As previously mentioned, depending on the sensed data, analytics manager 209 may include various types of analytics, such as objection recognition, audio recognition, comparative logic that compares parameters and parameter values with threshold parameters and parameter values, or another type of analytic logic. Depending on the event to be detected, the criteria information may include text data, image data, audio data, and/or a parameter/parameter value (e.g., odor strength and classification, etc.), or another type of data that can be used by analytics manager 209 as a basis for event detection.

Analytics manager 209 includes logic that generates event detection data based on a result of the analysis. For example, the event detection data may indicate the presence or the absence of the event, the type of event (e.g., a fire, a person of interest identified, etc.), and/or other types of data (e.g., the date, the time, the location) relating to the detection of the event. The event detection data may be stored by data manager 207.

Analytics manager 209 includes logic that provides an outcome service in which the result of event detection may be automatically reported to a user/end device, device 127, or other type of destination device. For example, analytics manager 209 may generate a message, which indicates that a person of interest was detected, that an odor of interest was detected, etc., to another device. According to other exemplary embodiments, MEC device 117 may allow for the access and use of this information by another network device, a third party, etc., via the query service.

Query manager 211 includes logic that provides a query service. According to an exemplary embodiment, query manager 211 includes logic that receives a query request, and performs a search of event detection service data based on the query request. According to an exemplary embodiment, query manager 211 performs a search based on criteria information included in the query request. For example, query manager 211 may parse the query request and identify the criteria information. The criteria information may include, for example, a date, a time, and a location. By way of further example, the criteria information may indicate a single date (e.g., Jun. 27, 2018) or a range of dates (e.g., Jun. 27, 2018-Jun. 28, 2018, etc.). Similarly, the criteria information may indicate a time period (e.g., 4:00 pm-5:00 pm, etc.) and a locale (e.g., a city, a city intersection, a mailing address, etc.). The criteria information may include other types of information, such as, for example, the type of event for which the sensed data is to be used (e.g., a crime versus a lost pet, etc.), a quality level of the sensed data (e.g., relating to audio/visual resolution), the number of vantage points (e.g., minimum number, maximum number, etc.), the type of vantage points (e.g., aerial versus street view, etc.), the type of sensed data (e.g., video data, light data, heat data, etc.), and/or another configurable criterion.

According to an exemplary embodiment, query manager 211 includes an interactive graphical user interface (GUI). For example, a user of the event detection service may input and submit a query request via an end device and the interactive GUI. The interactive GUI may allow the user to submit the criteria information. The interactive GUI may generate a query response (e.g., links to audio/video clips) based on a result of the search and the selected video data. According to other exemplary embodiments, query manager 211 may interact with the user without an interactive GUI (e.g., receiving and transmitting messages). For example, query manager 205 may generate and transmit a query response based on the result of the search. For example, the query response may include one or multiple instances of data pertaining to a record 301.

Trigger manager 213 that includes logic that provides a trigger service that triggers vehicular device 180 to capture sensed data on behalf of the event detection service. For example, trigger manager 213 may communicate a trigger message to vehicular device 180. In some exemplary embodiments, in response to receiving the trigger message, vehicular device 180 may collect sensed data. According to other exemplary embodiments, the trigger message may include date, time, and/or location information indicating when/where vehicular device 180 may collect sensed data. In this regard, vehicular device 180 may begin capturing sensed data immediately in response to receiving the trigger message, or wait until criteria information (e.g., date, time, location, etc.) are satisfied. According to yet other exemplary embodiments, the trigger message may include other types of data that may govern the operation of the sensor. For example, for a camera, the message may include data that indicates a particular setting (e.g., one of multiple settings) for field of view and/or another type of camera setting.

Trigger manager 213 further includes logic that provides a trigger request service that allows a user to invoke the detection of an event. For example, the user may transmit a trigger request message to MEC device 117. The trigger request may include date, time and location information. The trigger request message may include other types of data, such a parameter and a parameter value pertaining to the capturing of the sensed data, such as a quality level of the sensed data (e.g., relating to audio/visual resolution, etc.), a type of event for which the sensed data is to be used (e.g., a crime versus a lost pet, etc.), the type of sensor (e.g., auditory, visual, light, etc.), the type of sensed data (e.g., video data, light data, heat data, etc.), and/or another configurable criterion, as well as an image, text data, an audio file (e.g., voice sample of a person, etc.), or another type of data that may be used by the analytics service.

In response to receiving the trigger request message, MEC device 117 may transmit a trigger message via access device(s) 107 of access network 105 to vehicular devices 180 that are located in the specified location during the specified date and time periods. MEC device 117 may receive response messages, which include sensed data and metadata, from vehicular devices 180.

Link 215 provides a communicative link between two or more components in which data may be communicated. Link 215 may be implemented as a hardware link (e.g., a bus, a shared memory space, etc.), a software link (e.g., inter-process communication (IPC), etc.) or some other type of communicative link (e.g., an application programming interface (API), etc.).

Core network 120 may include one or multiple networks of one or multiple network types and technologies. Core network 120 may include a complementary network of access network 105. For example, core network 120 may be implemented to include an Evolved Packet Core (EPC) of an LTE, an LTE-A, an LTE-A Pro, a next generation core (NGC) network, and/or a legacy core network.

Depending on the implementation of core network 120, core network 120 may include various network devices that are illustrated in FIG. 1 as core devices 122. For example, core devices 122 may include a mobility management entity (MME), a packet gateway (PGW), a serving gateway (SGW), a home subscriber server (HSS), an authentication, authorization, and accounting (AAA) server, a policy charging and rules function (PCRF), a charging system (CS), a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and so forth. According to other exemplary implementations, core network 120 may include additional, different, and/or fewer network devices than those described.

External network 125 may include one or multiple networks. For example, external network 125 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a data center, or other type of network that hosts an end device application or service. For example, the end device application/service network may provide various applications or services pertaining to broadband access in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, etc.), extreme real-time communications (e.g., tactile Internet, etc.), lifeline communications (e.g., natural disaster, etc.), ultra-reliable communications (e.g., automated traffic control and driving, collaborative robots, health-related services (e.g., monitoring, remote surgery, etc.), drone delivery, public safety, etc.), and/or broadcast-like services.

Depending on the implementation of external network 125, external network 125 may include various network devices depicted in FIG. 1 as devices 127. For example, devices 127 may provide various applications, services, or other type of end device assets, such as servers (e.g., web, application, cloud, etc.), mass storage devices, data center devices, routers, and/or other types of network devices pertaining to various network-related functions.

According to an exemplary embodiment, one or multiple devices 127 may include logic that interfaces with the event detection service, as described herein. For example, device 127 may include logic that receives event detection data or alerts from MEC device 117 pertaining to event detection. According to another example, device 127 may include logic that transmits a trigger message to MEC device 117 and invoke the triggering service. For example, the trigger message may include criteria information. According to other exemplary embodiments, one or multiple devices 127 may provide one or multiple services similar to those described in relation to MEC device 117.

Vehicular device 180 is a vehicular device that has one or multiple sensors, wireless communication capabilities, and logic that supports the event detection service, as described herein. Vehicular device 180 may be implemented as an autonomous vehicle (e.g., a driverless car, a driverless truck, etc.), a non-autonomous vehicle (e.g., a car, a truck, etc.), or an unmanned drone.

According to an exemplary embodiment, the sensor of vehicular device 180 is an auditory/visual sensor (e.g., a video camera/a microphone). In turn, for example, the event detection service may support an application/service pertaining to law enforcement (e.g., crimes, Amber alerts, etc.), missing persons (e.g., a mentally ill person, a lost child, etc.), missing animals (e.g., a lost pet, etc.), or another type of application/service (e.g., a public utility service, a city or town service, a public safety service, etc.) in which audio/video data is used in support of the event detection service (e.g., a downed utility pole, a downed tree, a spill, etc.). According to other exemplary embodiments, the sensor of vehicular device 180 may be implemented as another type of sensor. For example, depending on the event detection, vehicular device 180 may include an odor sensor, a chemical sensor, a heat sensor, a light sensor, or another type sensor. In turn, the event detection may relate to chemical spills, fires, explosions, power outages, gas leaks, or other types of events or objects.

FIG. 4 is a diagram illustrating exemplary components of vehicular device 180. As illustrated, vehicular device 180 includes an input and output manager 405, a sensor 407, a metadata manager 411, and a link 415. According to other exemplary embodiments, vehicular device 180 may include additional, fewer, and/or different components than those illustrated in FIG. 2 and described herein. Additionally, multiple components may be combined into a single component. Additionally, or alternatively, a single component may be implemented as multiple components in which a process or a function may be collaboratively performed or multiple processes or functions may be split between them. According to various embodiments, one or more of the components may operate on various planes of an environment. For example, the various planes may include a data plane, a control plane, a management plane, and/or other planes implemented within the environment.

Input and output manager 405 includes logic that manages the messages received and messages transmitted by vehicular device 180. For example, input and output manager 405 may include logic that receives and interprets a message indicating to capture sensed data, such as a trigger message. For example, the trigger message may be received from MEC device 117, device 127, or a user of vehicular device 180 (e.g., a driver, a passenger, a person operating/controlling the drone, etc.). According to some exemplary implementations, the trigger message may include date, time, and/or location information relating to when and/or where vehicular device 180 (e.g., sensor 407) is to capture sensed data in support of the event detection service. According to other exemplary implementations, the trigger message may not include date, time, and/or location information such that vehicular device 180 may capture sensed data in response to receipt of the message. Input and output manager 405 may communicate with sensor 407 and/or metadata manager 411, based on the receipt and interpretation of the message, so that the triggering of event detection is carried out.

According to other exemplary embodiments, input and output manager 405 may not include logic that receives and interprets such trigger messages. For example, in relation to a triggering service, vehicular device 180 may not be remotely triggered (e.g., via receipt of a trigger message from MEC device 117, device 127, or another source device) to capture sensed data because vehicular device 180 may be pre-configured with logic that governs when sensed data is captured. Additionally, input and output manager 405 may transmit the captured sensed data and metadata to MEC device 117 according to a pre-configured mechanism (e.g., a schedule, etc.).

Input and output manager 405 may further include logic that receives and interprets other types of messages and/or data. For example, the trigger message or another type of message may indicate the type of event for which the sensed data is to be used (e.g., a crime versus a lost pet, etc.), a quality level of the sensed data (e.g., relating to audio/visual resolution, etc.), the number of vantage points or samplings (e.g., minimum number, maximum number, etc.), the type of sensed data (e.g., video data, light data, heat data, etc.), and/or another configurable criterion.

Input and output manager 405 includes logic that generates and transmits messages. For example, input and output manager 405 may generate a detection message. The detection message may include sensed data and the metadata. Input and output manager 405 may transmit the detection message to MEC device 117, device 127, or another destination device.

Sensor 407 includes one or multiple sensors that capture and store sensed data. For example, sensor 407 may be implemented as an audio/video camera, a video camera, a microphone, an odor sensor, a chemical sensor, a gas sensor, a weather sensor (e.g., temperature, humidity, rain, wind, pressure, etc.), a heat sensor, a light sensor, a or another type sensor. According to some exemplary implementations, sensor 407 may be a sensor that is separate from a sensor that may be part of the vehicle. For example, sensor 407 (e.g., a video camera) may be separate and distinct from a sensor (e.g., a camera) that is used for collision avoidance, contributes to the operation of the vehicle, and is part of the vehicle when manufactured. According to other exemplary implementations, sensor 407 may be a sensor that is not separate and distinct, and may support operation of the vehicle and the event detection service. In this regard, sensed data may be captured and used to support multiple services (e.g., operation of the vehicle and the event detection service).

Metadata manager 411 includes logic that generates and tags sensed data with metadata. For example, metadata manager 411 may include a Global Positioning Service (GPS) receiver or other logic that calculates the location of vehicular device 180. Additionally, for example, metadata manager 411 may include a clock or other logic that measures date (e.g., month, day, and year) and time information (e.g. hour, minutes, seconds, etc.).

According to some exemplary embodiments, metadata manager 411 may further include logic that causes sensor 407 to capture sensed data in accordance with date, time, and/or location information associated with a trigger message received by input and output manager 405. For example, the criteria information may indicate a single date (e.g., Jun. 27, 2018) or a range of dates (e.g., Jun. 27, 2018-Jun. 28, 2018, etc.). Similarly, the criteria information may indicate a time period (e.g., 4:00 pm-5:00 pm, etc.) and/or a locale (e.g., a city, a city intersection, a mailing address, a street, latitude and longitude, etc.). According to some exemplary embodiments, the criteria information may include a concatenation or a series of criteria information. For example, the criteria information indicate a first set of date, time, and/or location information, and a second set of date, time, and/or location information, such that the date, time and/or location of the first set may have different values from the date, time, and/or location of the second set.

Link 215 provides a communicative link between two or more components in which data may be communicated. Link 215 may be implemented as a hardware link (e.g., a bus, a shared memory space, etc.), a software link (e.g., inter-process communication (IPC), etc.) or some combination thereof.

Figure 5A:
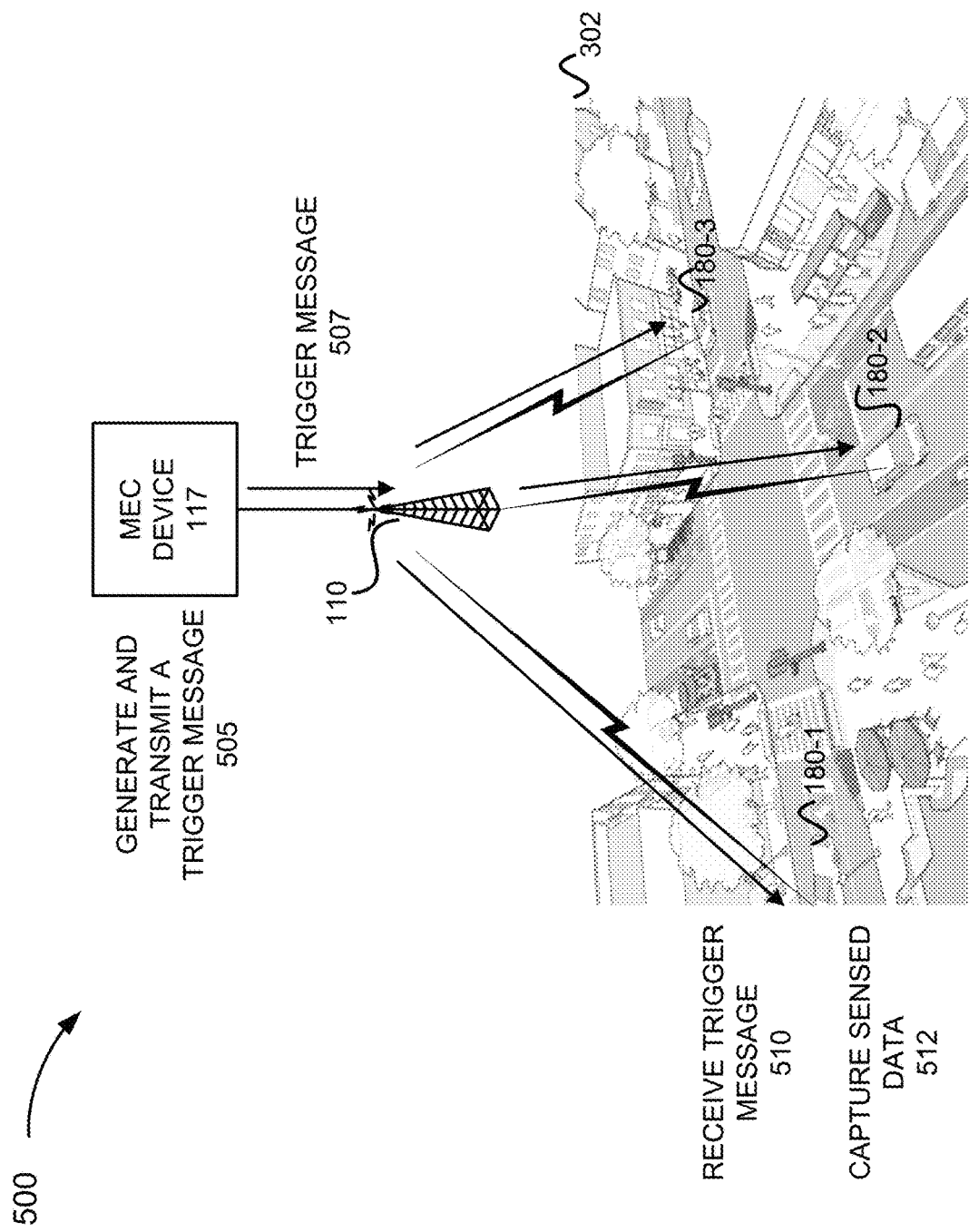

FIGS. 5A-5E are diagrams illustrating exemplary processes of the event detection service. Referring to FIG. 5A, according to an exemplary process 500, as illustrated, vehicular devices 180-1 through 180-3 (also referred to as vehicular devices 180, and generally or individually as vehicular device 180) are situated at a location 302, such as a city intersection. Each vehicular device 180 includes a sensor that is configured to capture video/audio data, generate metadata pertaining to the video/audio data, and provide the video/audio data and the metadata to MEC device 117 in support of the event detection service, as described herein.

According to this exemplary scenario, MEC device 117 generates and transmits a trigger message 505. For example, MEC device 117 may be invoked to transmit the trigger message based on the trigger request service, as described herein. Alternatively, MEC device 117 may transmit the trigger message according to a pre-configured schedule or other type of internal configuration. For example, MEC device 117 may use third party data that serves as a basis to generate and transmit the trigger message. According to one example, MEC device 117 may ingest weather information that indicates severe weather (e.g., a storm, a tornado, etc.) in a particular locale. In response to this information, MEC device 117 may generate and transmit a trigger message to collect sensed data for a particular event (e.g., downed utility pole, a downed tree in the road) and/or a vehicular accident. According to another example, the weather information may indicate severe temperatures (e.g., extreme hot or cold). In this regard, MEC device 117 may generate and transmit a trigger message to collect sensed data for a power outage (e.g., stemming from overuse of the power grid) or a fire (e.g., extreme heat causing a fire). In contrast to other exemplary embodiments, the trigger message may indicate the type of event to which the trigger message is directed. In turn, vehicular device 110 may be configured to capture the sensed data in a manner that is conducive for this particular event detection (e.g., adjustment of resolution of video or another parameter pertaining to the capture of sensed data). As illustrated, the trigger message 507 propagates to vehicular devices 180 via a wireless station 110 of access network 105. For example, wireless station 110 may broadcast the trigger message in the geographic cell that it serves, which includes location 302. As further illustrated, each vehicular device 180 receives the trigger message 510, and captures sensed data 512 in response to the receipt of the message and in accordance with criteria information included in the trigger message.

Figure 5B:
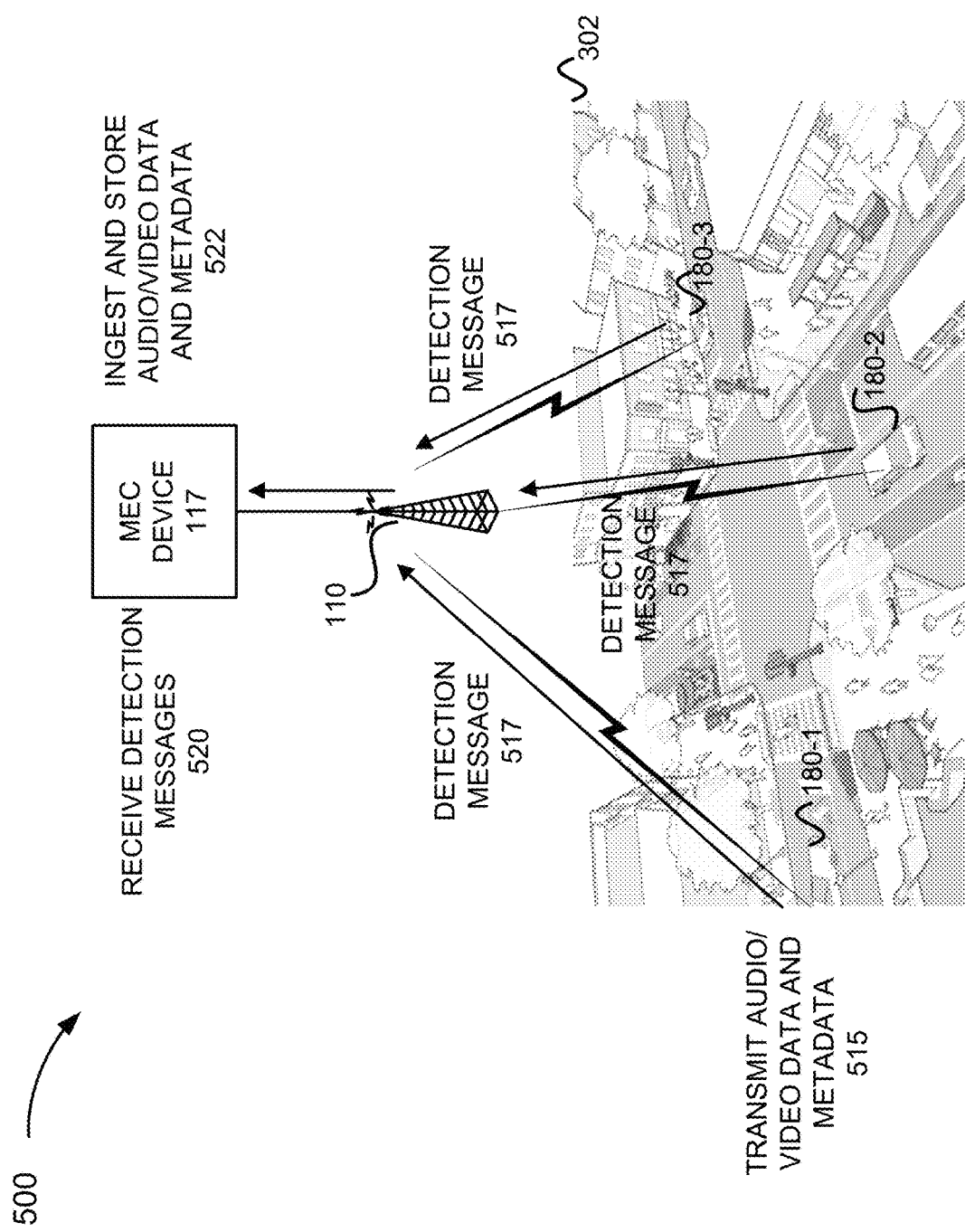

Referring to FIG. 5B, each vehicular device 180 generates and transmits audio/video data and metadata 515 to MEC device 117 via wireless station 110. For example, a detection message 517 may include the audio/video data and metadata, which is forwarded by wireless station 110 to MEC device 117. MEC device 117 receives the detection messages 520, and ingests and stores the audio/video data and the metadata 522. For example, MEC device 117 may identify the metadata (e.g., date, time, location) and also identify the type of sensed data (e.g., audio/video data). MEC device 117 may generate and correlate other types of metadata, such as metadata indicating the resolution of the sensed data, the type of vehicular device 180 from which the sensed data is obtained (e.g., autonomous vehicle versus unmanned drone), the type of vantage point, and/or other types of metadata that may indicate an attribute of the vehicular device 180 and/or the sensed data.

Referring to FIG. 5C, MEC device 117 analyzes the sensed data based on criteria information 525. For example, MEC device 117 may use criteria information that is correlated to the sensed data, such as image data. According to some exemplary scenarios, MEC device 117 may select the criteria information based on the type of event to be detected. MEC device 117 determines whether an event is identified or detected based on the analysis. As further illustrated, MEC device 117 generates and stores event detection data 528. According to this exemplary scenario, the event detection data indicates that an event was detected or identified.

Figure 5D:
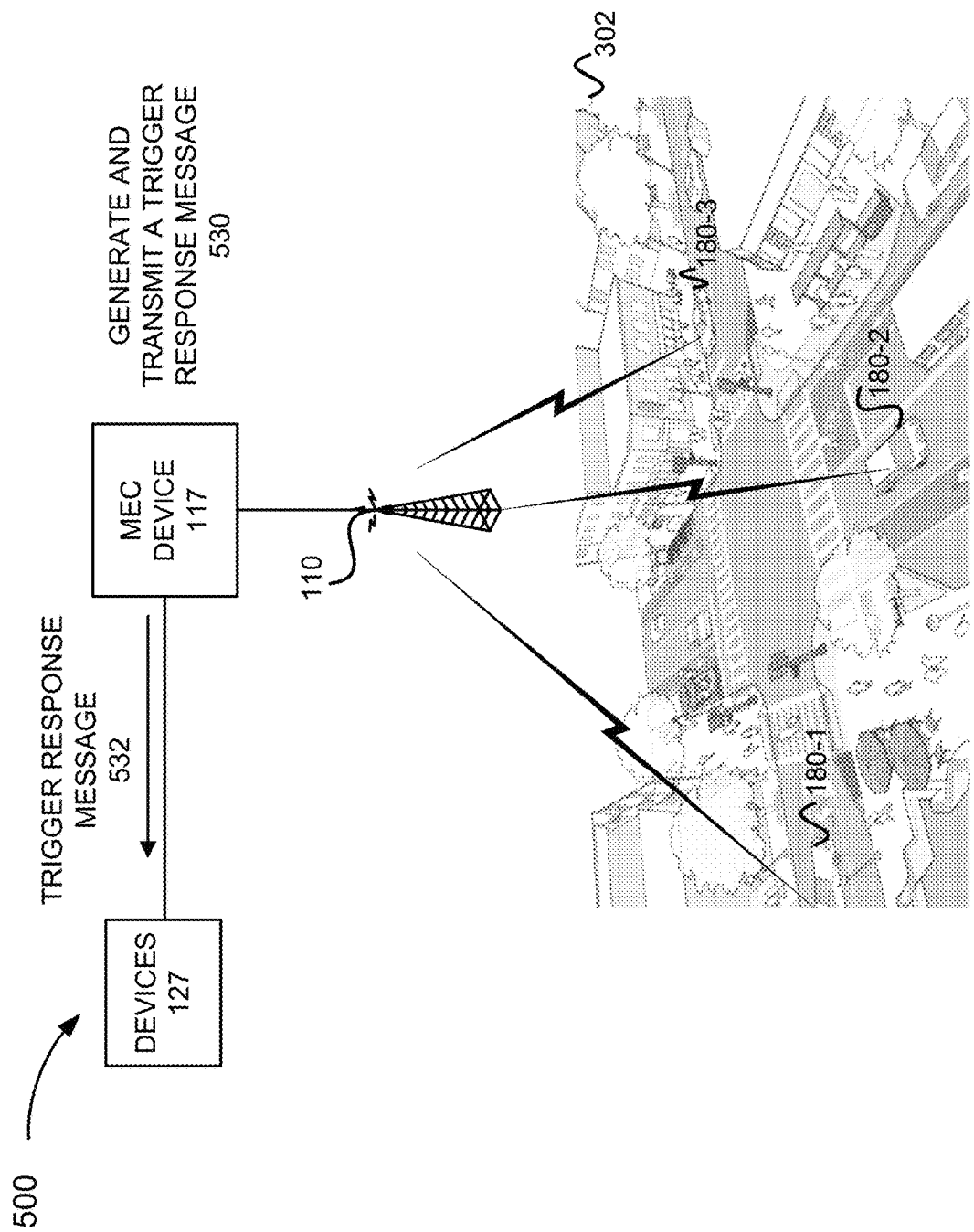

Referring to FIG. 5D, MEC device 117 may generate and transmit a trigger response message to device 127 (or another device). For example, a trigger response message 532 includes data that indicates the event was identified or detected. Trigger response message 532 may include other types of event detection service data, as previously described.

Referring to FIG. 5E, according to an exemplary process 550, assume that a user 555 wishes to use the event detection service, via an end device 560. For example, end device 560 may be a mobile, portable, or stationary end user device. By way of further example, end device 560 may be a computer (e.g., laptop, desktop, etc.), a smartphone, a tablet, a terminal, or another type of end user device. End device 560 may include a client or an agent (e.g., a browser or another type of user interface) to access and use the event detection service. User 555 may log into MEC device 117, and various security measures may be performed (e.g., authentication, authorization, etc.). It may be assumed that user 555 successfully accesses the event detection service.

User 555 may generate a query request 562 via end device 560. For example, user 555 may use an interactive GUI of MEC device 117 that allows user 555 to specify criteria information. For example, user 555 may specify a date, a time, and a location. User 555 may also specify other types of criteria information, as previously described. As illustrated, a query request 565 may be transmitted to MEC device 117, and MEC device 117 receives the query request 567.

Figure 5F:
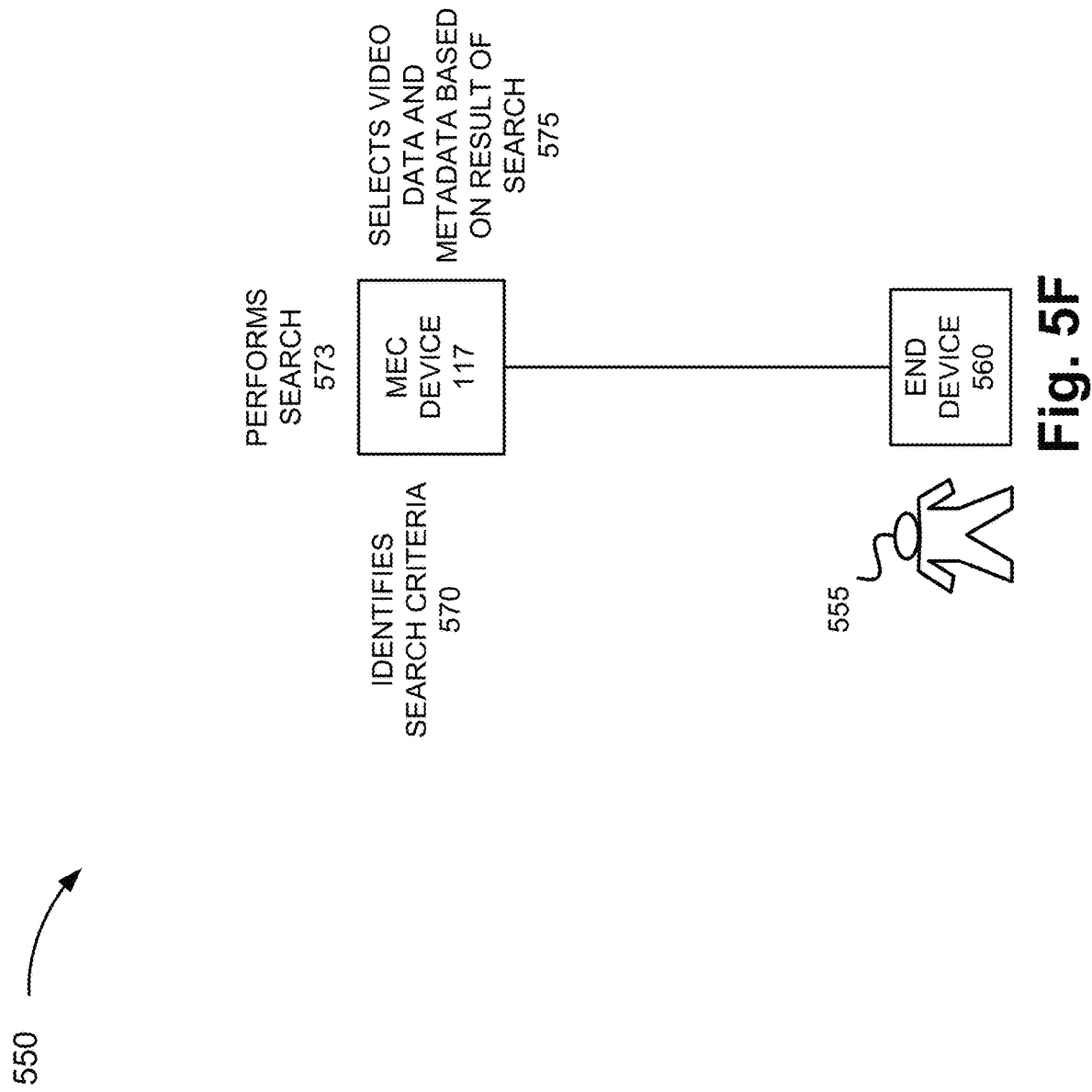

Referring to FIG. 5F, in response to receiving the query request, MEC device 117 may parse the query request and identify the search criteria 570. Based on the identification of the search criteria, MEC device 117 performs a search 573. For example, MEC device 117 may search a database or other data structure using the identified search criteria. MEC device 117 may compare and match the search criteria (e.g., date, time, location, etc.) with the video data and the metadata stored in a storage repository device. MEC device 117 selects video data and metadata based on a result of the search 575.

Figure 5G:
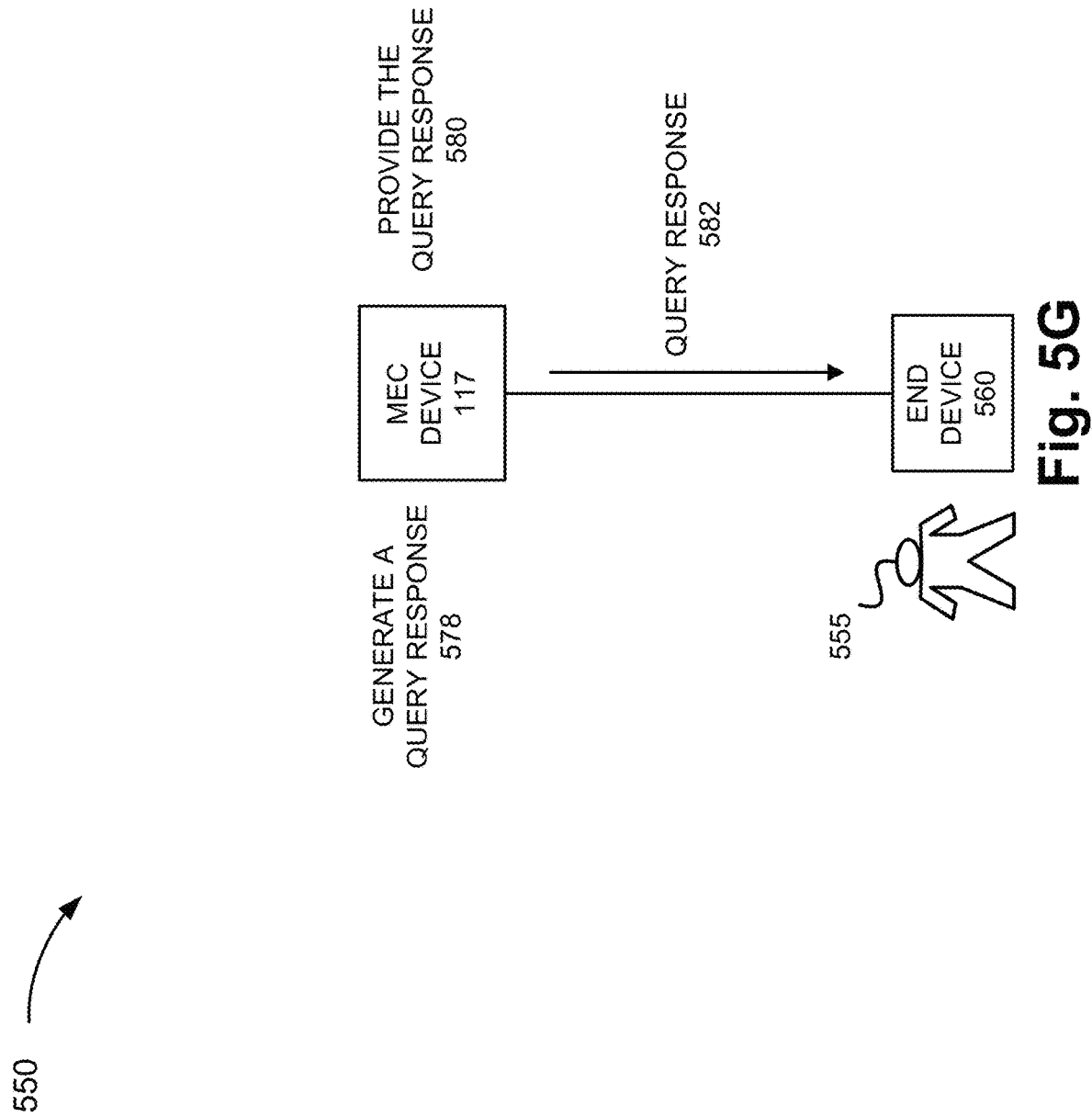

Referring to FIG. 5G, MEC device 117 provides to user 555 the result of the search. For example, MEC device 117 may generate a query response 578, and may provide the query response 580 to user 555 via the interactive GUI.

According to an exemplary implementation, a query response 582 may include a link to each video clip via which user 555 may access, play, and/or download the video clip.

Although FIGS. 5A-5G illustrate exemplary processes of the event detection service, according to other exemplary embodiments, a process may include additional, different, and/or fewer steps. For example, the process may include steps relating to the intelligence service, as described herein.

Figure 6:
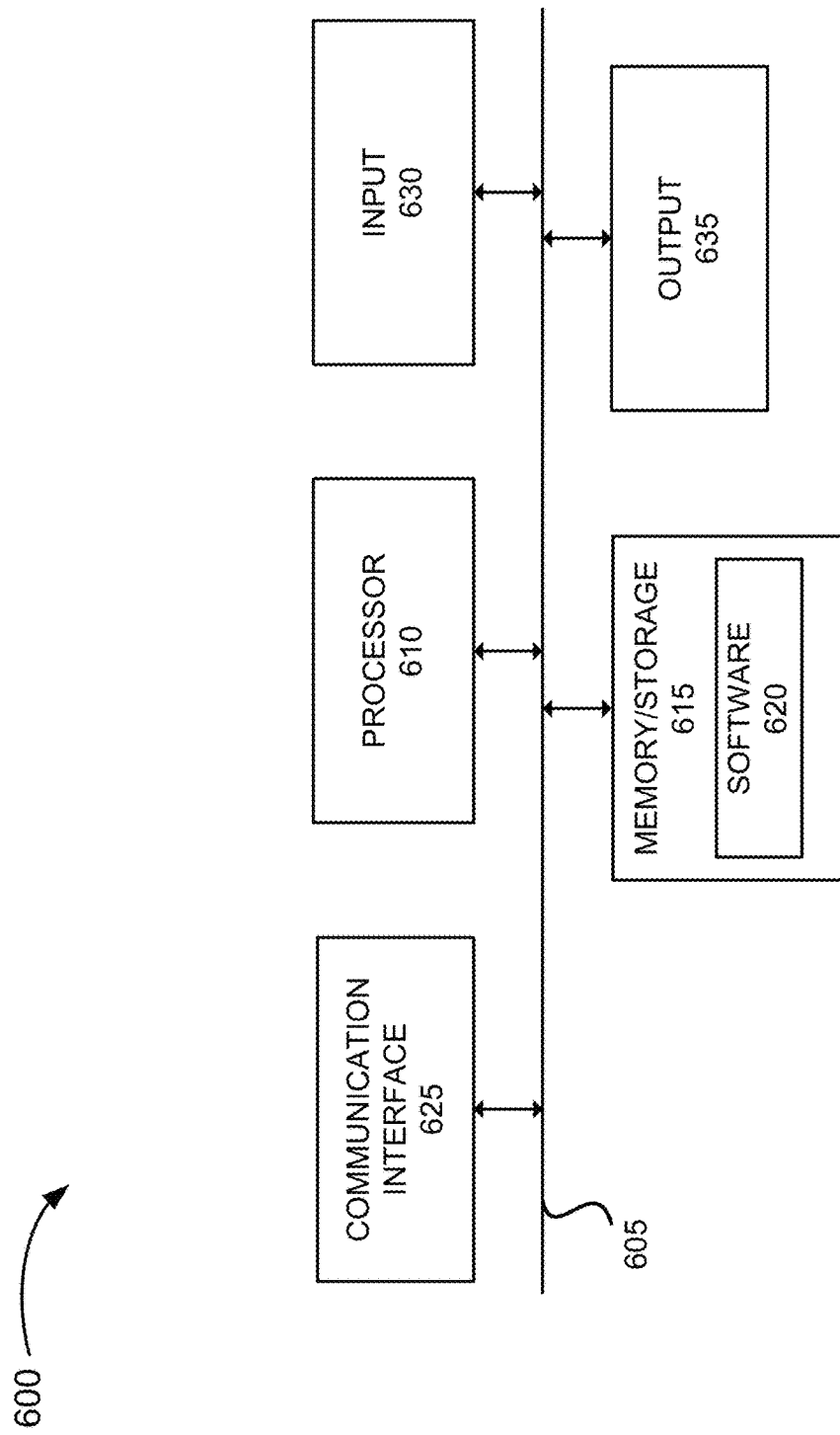
FIG. 6 is a diagram illustrating exemplary components of a device that may correspond to one or more of the devices illustrated and described herein.

FIG. 6 is a diagram illustrating exemplary components of a device 600 that may be included in one or more of the devices described herein. For example, device 600 may correspond to components included in wireless station 110, MEC 125, end device 180, and MEC device 117. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium.

Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. As an example, with reference to MEC device 117, software 620 may include an application that, when executed by processor 610, provides a function of the event detection service, as described herein. Additionally, with reference to vehicular device 180, software 620 may include an application that, when executed by processor 610, provides a function of the event detection service, as described herein. Software 620 may also include firmware, middleware, microcode, hardware description language (HDL), and/or other form of instruction. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, application programming interface (API), etc.). Communication interface 625 may be implemented as a point-to-point interface, a service based interface, etc.

Input 630 permits an input into device 600. For example, input 630 may include a keyboard, a mouse, a display, a touchscreen, a touchless screen, a button, a switch, an input port, speech recognition logic, and/or some other type of visual, auditory, tactile, etc., input component. Output 635 permits an output from device 600. For example, output 635 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 600 may be implemented in the same manner. For example, device 600 may be instantiated, spun up, spun down, etc., using well-known virtualization techniques in a public/private cloud or other type of network.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process described herein. Alternatively, for example, according to other implementations, device 600 performs a process described herein based on the execution of hardware (processor 610, etc.).

Figure 7:
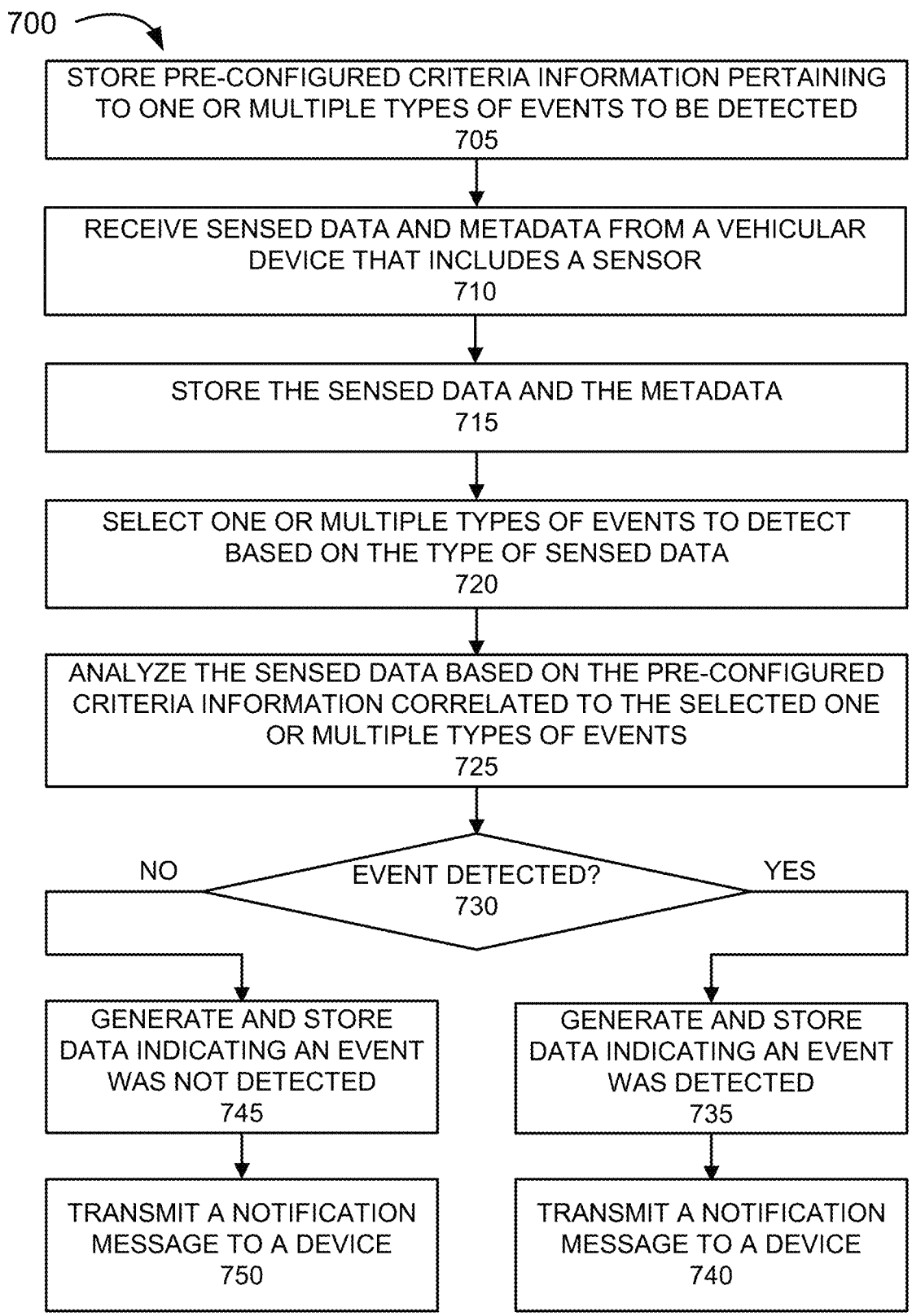
FIG. 7 is a flow diagram illustrating an exemplary process of an exemplary embodiment of the event detection service.

FIG. 7 is a flow diagram illustrating an exemplary process 700 of an exemplary embodiment of the event detection service. According to an exemplary embodiment, a network device (e.g., MEC device 117) that provides the event detection service, as described herein, performs steps of process 700. For example, processor 610 executes software 620 to perform a step illustrated in FIG. 7, and described herein.

Referring to FIG. 7, in block 705, pre-configured criteria information pertaining to one or multiple types of events to be detected is stored. For example, MEC device 117 may store a threshold parameter and parameter value, an inference model, an auditory signature, and/or another type data that is used as a basis for event detection.

In block 710, sensed data and metadata are received from a vehicular device that includes a sensor. For example, MEC device 117 receives sensed data (e.g., audio/video data, video data, or another type of sensed data as described herein)) from vehicular devices 180. According to some exemplary embodiments, vehicular device 180 may provide each instance of metadata. According to other exemplary embodiments, vehicular device 180 may provide only a portion of the metadata. For example, MEC device 117 may add date and time information to the sensed data based on its receipt of the sensed data. Additionally, or alternatively, for example, MEC device 117 may add other types of metadata pertaining to the sensed data, such as the resolution of the sensed data, etc., as previously described. Additionally, or alternatively, for example, wireless station 110 or another intermediary network device may provide location information relating to the vehicular device 180 and the sensed data based on known location-based technologies (e.g., triangulation, etc.).

In block 715, the sensed data and the metadata are stored. For example, MEC device 117 stores the sensed data and the metadata in a database or another type of data structure.

In block 720, one or multiple types of events to detect may be selected based on the type of sensed data. For example, MEC device 117 may select one or multiple types of events (e.g., pre-configured types of events) based on the type of sensed data. For example, MEC device 117 may select an explosion, as a type of event to detect, based on receiving audio data. According to other examples, MEC device 117 may select one or multiple other types of events based on the type of sensed data (e.g., video data, etc.).

In block 725, the sensed data may be analyzed based on the pre-configured criteria information correlated to the selected one or multiple types of events. For example, MEC device 117 may analyze the sensed data based on the pre-configured criteria information, as described herein.

In block 730, it may be determined whether an event is detected. For example, MEC device 117 may determine whether the event is detected based on the analysis of the sensed data, as described herein.

When it is determined that an event is detected (block 730—YES), data indicating an event was detected may be generated and stored (block 735). For example, MEC device 117 may generate and store event detection data in a database or another type of data structure. In block 740, a notification message may be transmitted to a device. For example, MEC device 117 may transmit a notification message, which includes data that indicates that an event was detected, to device 127 or an end user device. The notification message may include other types of data (e.g., an identifier of the event, the type of event, a link to the sensed data and the metadata, etc.).

When it is determined that an event is not detected (block 730—NO), data indicating an event was not detected may be generated and stored (block 745). For example, MEC device 117 may generate and store event detection data in a database or another type of data structure. In block 750, a notification message may be transmitted to a device. For example, MEC device 117 may transmit a notification message, which includes data that indicates the lack of detection of the event, to device 127 or an end user device.

Although FIG. 7 illustrates an exemplary process 700 of the event detection service, according to other embodiments, process 700 may include additional operations, fewer operations, and/or different operations than those illustrated in FIG. 7, and described herein. For example, blocks 740 and/or 750 may be omitted. According to other exemplary embodiments, process 700 may include steps that pertain to the triggering request service, as described herein. Additionally, process 700 may use dynamic (i.e., not pre-configured) criteria information (e.g., image of a lost child, etc.) to analyze an event, select the type of event, etc., as previously described.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the process illustrated in FIG. 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software (e.g., software 620).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 610) of a device. A non-transitory storage medium includes one or more of the storage mediums described in relation to memory/storage 615.

To the extent the aforementioned embodiments collect, store or employ personal information provided by individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
   storing, by a network device of a Multi-access Edge Computing (MEC) network, pre-configured criteria information pertaining to one or multiple types of events to be detected;
   receiving, by the network device, first sensed data from a first vehicular device of a first vehicle that includes a first sensor, wherein the first sensor is native to the first vehicle and supports a native operation performed by the first vehicle and the first sensor detects the first sensed data, and wherein the first sensor includes a video camera and the first sensed data includes video data;
   selecting, by the network device in response to the receiving, at least one of the one or multiple types of events based on a type of the first sensed data;
   analyzing, by the network device in response to the selecting, the first sensed data based on the pre-configured criteria information that correlates to the selected at least one of the one or multiple types of events;
   determining, by the network device in response to the analyzing, whether the at least one of the one or multiple types of events is detected;
   generating, by the network device, data indicating the at least one of the one or multiple types of events is detected when it is determined that the at least one of the one or multiple types of events is detected; and
   transmitting, by the network device in response to the generating, the data to another device.

2. The method of claim 1, wherein the one or multiple types of events pertain to a public safety event that includes at least one of a fire, an explosion, or a chemical spill.

3. The method of claim 1, wherein the pre-configured criteria information includes one or multiple inference models configured for object recognition pertaining to the at least one of the one or multiple types of events.

4. The method of claim 1, wherein the one or multiple types of events pertain to broken utility equipment associated with a delivery of at least one of electricity, telephone, television, or water.

5. The method of claim 1, wherein the analyzing further comprising:
   using, by the network device, two or more different types of first sensed data to determine whether the at least one of the one or multiple types of events is detected.

6. The method of claim 1, further comprising:
   storing, by the network device, event detection data and metadata pertaining to the at least one of the one or multiple types of events that have been detected;
   receiving, by the network device from an end device associated with a user, a request to search the event detection data and the metadata based on one or multiple criteria; and
   providing, by the network device to the end device, a response that includes a result of the search based on the one or multiple criteria.

7. The method of claim 1, further comprising:
   receiving, by the network device, first metadata pertaining to the first sensed data, wherein the first metadata indicates a first date, a first time, and a first location; and
   transmitting, by the network device to a second vehicular device of a second vehicle in a locale of the at least one of the one or multiple types of events via a wireless access network, a message that triggers a capture of second sensed data that is of a different type than the first sensed data, when it is determined that the at least one of the one or multiple types of events is detected, and wherein the message indicates a setting for a second sensor of the second vehicular device.

8. The method of claim 1,
   wherein the native operation includes parking assistance.

9. A network device of a Multi-access Edge Computing (MEC) network comprising:
   a communication interface;
   a memory, wherein the memory stores instructions; and
   a processor, wherein the processor executes the instructions to:

store pre-configured criteria information pertaining to one or multiple types of events to be detected;

receive, via the communication interface, first sensed data from a first vehicular device of a first vehicle that includes a first sensor, wherein the first sensor is native to the first vehicle and supports a native operation performed by the first vehicle and the first sensor detects the first sensed data, and wherein the first sensor includes a video camera and the first sensed data includes video data;

select, in response to the receipt of the first sensed data, at least one of the one or multiple types of events based on a type of the first sensed data;

analyze, in response to the selection, the first sensed data based on the pre-configured criteria information that correlates to the selected at least one of the one or multiple types of events;

determine, in response to the analysis, whether the at least one of the one or multiple types of events is detected;

generate data indicating the at least one of the one or multiple types of events is detected when it is determined that the at least one of the one or multiple types of events is detected; and transmit, via the communication interface, in response to the generation, the data to another device.

10. The network device of claim 9, wherein the one or multiple types of events pertain to a public safety event that includes at least one of a fire, an explosion, or a chemical spill.

11. The network device of claim 9, wherein the pre-configured criteria information includes one or multiple inference models configured for object recognition pertaining to the at least one of the one or multiple types of events.

12. The network device of claim 9, wherein the one or multiple types of events pertain to broken utility equipment associated with a delivery of at least one of electricity, telephone, television, or water.

13. The network device of claim 9, wherein when analyzing, the processor further executes the instructions to:

use two or more different types of first sensed data to determine whether the at least one of the one or multiple types of events is detected.

14. The network device of claim 9, wherein the processor further executes the instructions to:

store event detection data and metadata pertaining to the at least one of the one or multiple types of events that have been detected;

receive, via the communication interface from an end device associated with a user, a request to search the event detection data and the metadata based on one or multiple criteria; and provide a response that includes a result of the search based on the one or multiple criteria.

15. The network device of claim 9, wherein the processor further executes the instructions to:

receive, via the communication interface, first metadata pertaining to the first sensed data, wherein the first metadata indicates a first date, a first time, and a first location; and transmit, via the communication interface to a second vehicular device of a second vehicle in a locale of the at least one of the one or multiple types of events via a wireless access network, a message that triggers a capture of second sensed data that is of a different type than the first sensed data, when it is determined that the at least one of the one or multiple types of events is detected, and wherein the message indicates a setting for a second sensor of the second vehicular device.

16. The network device of claim 9, wherein the native operation includes parking assistance.

17. A non-transitory, computer-readable storage medium storing instructions executable by a processor of a device of a Multi-access Edge Computing (MEC) network, which when executed cause the device to:

store pre-configured criteria information pertaining to one or multiple types of events to be detected;

receive first sensed data from a first vehicular device of a first vehicle that includes a first sensor, wherein the first sensor is native to the first vehicle and supports a native operation performed by the first vehicle and the first sensor detects the first sensed data, and wherein the first sensor includes a video camera and the first sensed data includes video data;

select, in response to the receipt of the first sensed data, at least one of the one or multiple types of events based on a type of the first sensed data;

analyze, in response to the selection, the first sensed data based on the pre-configured criteria information that correlates to the selected at least one of the one or multiple types of events;

determine, in response to the analysis, whether the at least one of the one or multiple types of events is detected;

generate data indicating the at least one of the one or multiple types of events is detected when it is determined that the at least one of the one or multiple types of events is detected; and transmit in response to the generation, the data to another device.

18. The non-transitory, computer-readable storage medium of claim 17, wherein the pre-configured criteria information includes one or multiple inference models configured for object recognition pertaining to the at least one of the one or multiple types of events.

19. The non-transitory, computer-readable storage medium of claim 17, wherein the one or multiple types of events pertain to a public safety event that includes at least one of a fire, an explosion, or a chemical spill.

20. The non-transitory, computer-readable storage medium of claim 17, wherein the one or multiple types of events pertain to broken utility equipment associated with a delivery of at least one of electricity, telephone, television, or water.

* * * * *